United States Patent
Takamura et al.

(10) Patent No.: US 8,825,253 B2
(45) Date of Patent: Sep. 2, 2014

(54) HYBRID VEHICLE CONTROL DEVICE

(75) Inventors: Yutaka Takamura, Yokohama (JP);
Hiroyuki Ashizawa, Yokohama (JP);
Haruhisa Tsuchikawa, Yokohama (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 29 days.

(21) Appl. No.: 13/880,398

(22) PCT Filed: Oct. 20, 2011

(86) PCT No.: PCT/JP2011/074110
§ 371 (c)(1),
(2), (4) Date: Jun. 24, 2013

(87) PCT Pub. No.: WO2012/053576
PCT Pub. Date: Apr. 26, 2012

(65) Prior Publication Data
US 2014/0195082 A1  Jul. 10, 2014

(30) Foreign Application Priority Data
Oct. 21, 2010  (JP) ................. 2010-236091

(51) Int. Cl.
| | | |
|---|---|---|
| B60W 20/00 | (2006.01) | |
| B60L 11/14 | (2006.01) | |
| B60L 15/20 | (2006.01) | |
| B60K 6/48 | (2007.10) | |
| B60L 11/18 | (2006.01) | |
| B60W 10/08 | (2006.01) | |
| B60W 10/02 | (2006.01) | |
| B60L 7/14 | (2006.01) | |
| B60W 10/06 | (2006.01) | |
| F16D 48/06 | (2006.01) | |

(52) U.S. Cl.
CPC ............... *B60W 20/40* (2013.01); *B60L 11/14* (2013.01); *Y02T 10/7077* (2013.01); *B60L 15/2054* (2013.01); *B60K 6/48* (2013.01); *B60L 2210/40* (2013.01); *B60L 11/1862* (2013.01); *B60L 2240/441* (2013.01); *B60L 2240/421* (2013.01); *Y10S 903/946* (2013.01); *B60L 2220/14* (2013.01); *F16D 2500/7044* (2013.01); *Y02T 10/6221* (2013.01); *B60W 10/08* (2013.01); *B60W 2710/081* (2013.01); *B60L 15/2009* (2013.01); *B60W 10/02* (2013.01); *B60L 2240/463* (2013.01); *F16D 2500/30406* (2013.01); *B60W 2710/0644* (2013.01); *B60W 2710/023* (2013.01); *F16D 2500/3061* (2013.01); *B60L 2240/12* (2013.01); *B60L 7/14* (2013.01); *B60L 2240/507* (2013.01); *B60L 2240/443* (2013.01); *F16D 2500/3068* (2013.01); *B60L 2270/145* (2013.01); *B60L 2250/26* (2013.01); *B60W 2540/10* (2013.01); *B60W 10/06* (2013.01); *B60L 2240/423* (2013.01); *F16D 2500/3165* (2013.01); *F16D 48/066* (2013.01); *B60W 20/00* (2013.01); *B60Y 2200/92* (2013.01); *B60L 2240/461* (2013.01); *B60W 2710/105* (2013.01); *Y02T 10/6286* (2013.01)
USPC ............................................. 701/22; 903/946

(58) Field of Classification Search
USPC .......................................................... 701/22
See application file for complete search history.

(56) References Cited

U.S. PATENT DOCUMENTS

| | | | | |
|---|---|---|---|---|
| 5,841,201 | A  * | 11/1998 | Tabata et al. ................. | 290/40 C |
| 8,060,268 | B2 * | 11/2011 | Hasegawa et al. .............. | 701/22 |
| 8,065,047 | B2 * | 11/2011 | Hasegawa et al. .............. | 701/22 |
| 2005/0209044 | A1 * | 9/2005 | Imazu et al. .................... | 477/15 |
| 2007/0272456 | A1 * | 11/2007 | Shiiba .......................... | 180/65.2 |

| | | | | |
|---|---|---|---|---|
| 2007/0275819 | A1* | 11/2007 | Hirata | 477/5 |
| 2009/0143950 | A1* | 6/2009 | Hasegawa et al. | 701/68 |
| 2010/0160111 | A1* | 6/2010 | Yamanaka et al. | 477/45 |

FOREIGN PATENT DOCUMENTS

| | | |
|---|---|---|
| JP | 2001-263383 A | 9/2001 |
| JP | 2009-209978 | 9/2009 |
| JP | 2009-209978 A | 9/2009 |
| JP | 2009-214641 A | 9/2009 |
| JP | 2010-30429 A | 2/2010 |
| JP | 2010-030429 A | 2/2010 |

\* cited by examiner

*Primary Examiner* — Thomas Tarcza
*Assistant Examiner* — Alex C Dunn
(74) *Attorney, Agent, or Firm* — Young Basile

(57) ABSTRACT

A hybrid vehicle control device is provided that is capable of achieving stable input torque control and torque capacity control of the clutch. When transitioning between a slip drive mode, in which the vehicle travels by controlling the rotation speed of the drive source and controlling the slip state of a starting clutch, and an engagement drive mode, in which the vehicle travels by controlling the torque of the drive source and completely engaging the starting clutch, the torque of the inertia component of the drive source side is deducted from the target drive torque set on the basis of the acceleration opening degree set as the starting clutch transfer torque capacity in the slip state.

4 Claims, 5 Drawing Sheets

FIG. 6
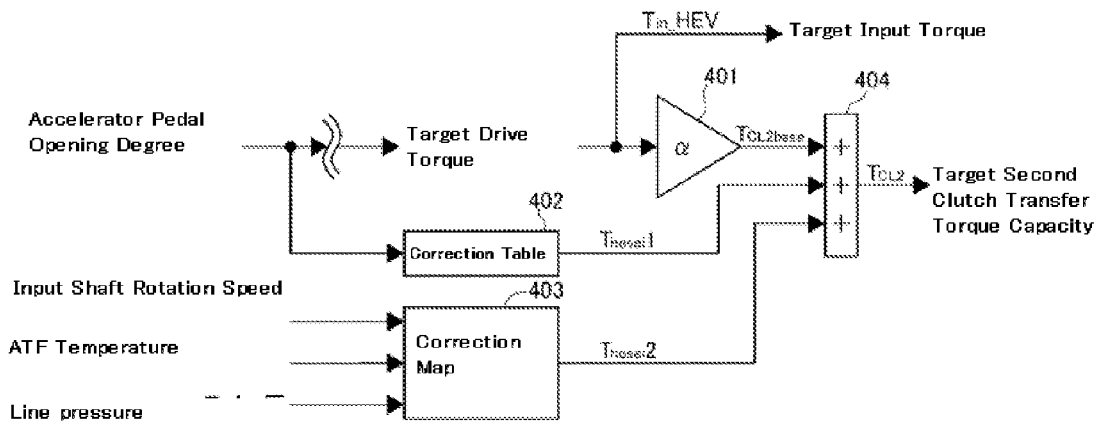
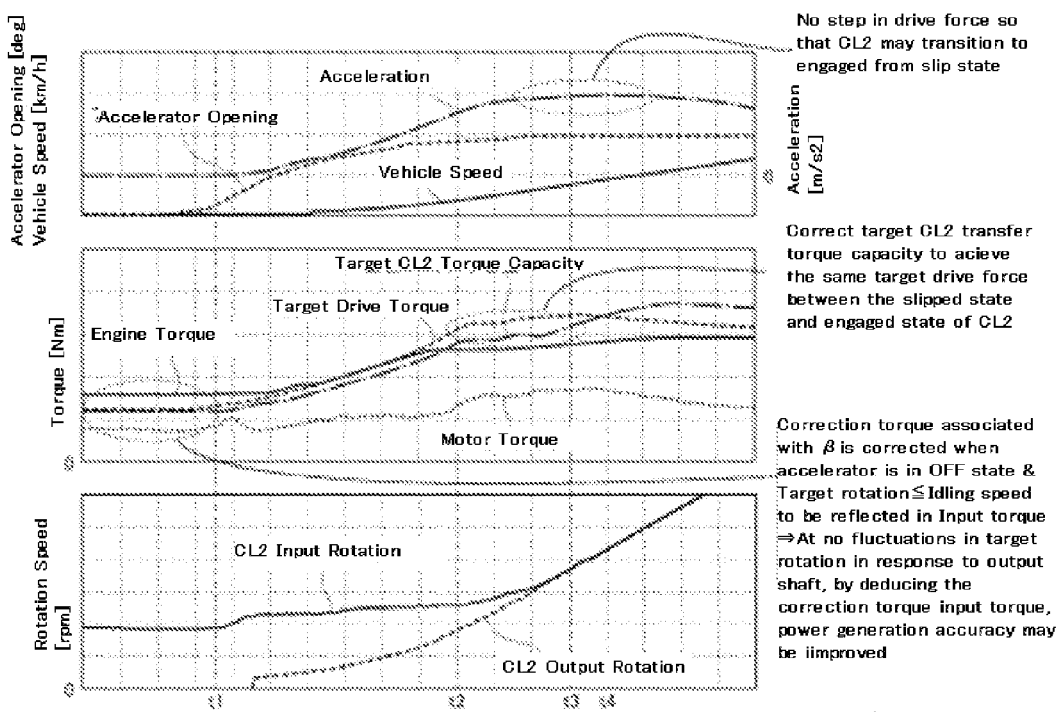
FIG. 7

HYBRID VEHICLE CONTROL DEVICE

TECHNICAL FIELD

The present invention relates to a control device for a hybrid vehicle using an engine and/or an electric motor as drive source.

BACKGROUND

As a control device for a hybrid vehicle, the technique described in Japanese Laid-Open Patent Publication No. 2001-263383 is disclosed. In this publication, in a slip drive mode in which the vehicle travels to cause a clutch between a motor and driving wheels to slip, the motor torque is determined based on the demand of the driver on the one hand, the transmission torque of the clutch is set to such a transmission torque capacity at which the input rotation speed to the clutch (i.e. motor speed) is maintained to be substantially constant, on the other.

However, since the technique described in the Patent Document focuses only on the rotational speed in the completely engaged state of clutch and the inertia of each of rotation elements are not taken into consideration, there is a problem that the engagement shock cannot be avoided sufficiently.

BRIEF SUMMARY

The present invention has been made in view of the above problems and aims to provide a control device that can perform a stable control of input torque and a torque capacity control of the clutch.

To achieve the above object, in the present invention, when a mode change takes place between a mode in which the vehicle travels at a slip drive mode with a drive source being under a rotation speed control and a start clutch under a slip control and a mode in which the vehicle travels at an engagement drive mode with the drive source being under a torque control and the start clutch under the complete engagement, a starting clutch transmission torque capacity at a slip state is configured to be obtained by subtracting such a torque associated with inertia components on the side of drive source from a target drive torque determined based on the accelerator opening degree.

Specifically, since the inertia components of drive torque transmission system changes depending upon whether the starting clutch is in the engaged state or the slip state, even at the starting clutch transmission torque being maintained constant, the torque output to driving wheels might vary. Therefore, by setting the starting clutch transmission torque capacity in such a way that the torque to be output to drive wheels would not change despite the change in inertia before and after the engagement, a step in drive force may be avoided to achieve stable drive conditions

BRIEF DESCRIPTION OF THE DRAWINGS

The description herein makes reference to the accompanying drawings wherein like reference numerals refer to like parts throughout the several views, and wherein:

FIG. 6 is a control block diagram for performing a target second clutch torque transfer capacity calculation process in the mode transition;

FIG. 7 is a time chart showing the starting state of the vehicle from the stopped state.

DETAILED DESCRIPTION

Hereinafter, embodiments of the present invention will be described with reference to the accompanying drawings.

Figure 1:
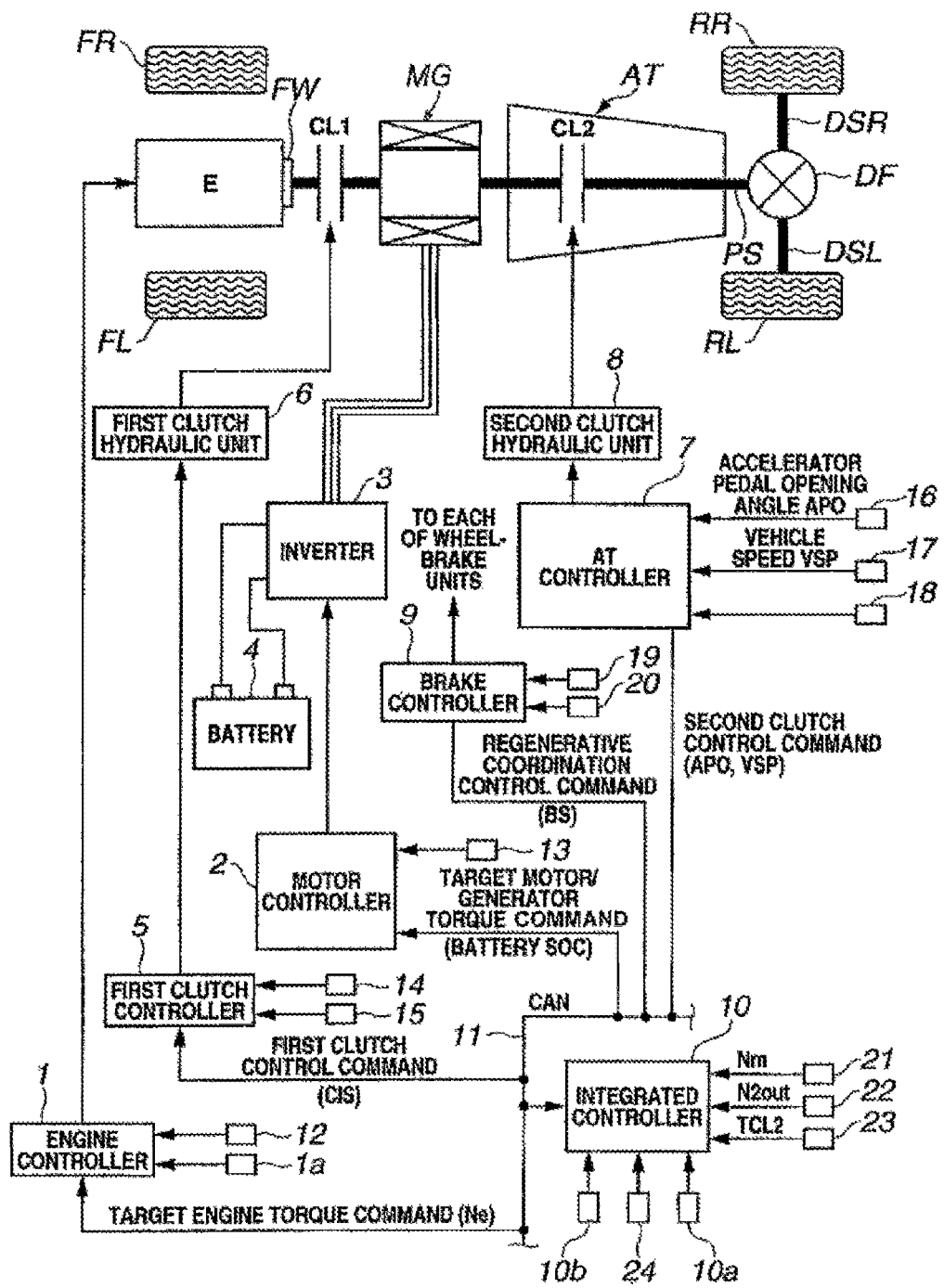
FIG. 1 is an overall system configuration of a rear-wheel drive hybrid vehicle in a first embodiment according to the invention.

First, a drive system of a hybrid vehicle will be explained. In FIG. 1, a system diagram showing a rear-wheel drive hybrid vehicle employing an engine start control system of the first embodiment is illustrated. The drive system of the hybrid vehicle in the first embodiment has, as shown in FIG. 1, an engine E, a first clutch CL1, a motor-generator MG, a second clutch CL2, an automatic transmission AT, a propeller shaft PS, a differential gear DF, a left drive shaft DSL, a right drive shaft DSR, a rear-left wheel RL (drive wheel) and a rear-right wheel RR (drive wheel). It should also be noted that FL is a front-left wheel, and FR is a front-right wheel.

The engine E is, for instance, a gasoline engine, and includes a throttle valve whose valve opening angle is controlled on the basis of a control command from an engine controller 1. Here, a flywheel FW is installed on an output shaft of engine E.

The first clutch CL1 is a clutch installed between the engine E and the motor-generator MG whose engagement and disengagement, including a slip-engagement, are controlled by control pressure produced by a first clutch hydraulic unit 6 on the basis of a control command from a first clutch controller 5.

The motor-generator MG is a synchronous type motor-generator in which permanent magnets are embedded into a rotor and stator coils are wound around a stator. The motor-generator MG is controlled by a three-phase alternating current generated by an inverter 3 and applied based on a control command from a motor controller 2. This motor-generator MG can be operated as an electric motor that revolves by receiving a supply of electrical power from a battery 4 (hereinafter, this state is called a power running state). In a case where the rotor is rotated by an external force, the motor-generator MG can also be operated as a generator that generates an electromotive force at both ends of the stator coil to enable charging of the battery 4 (hereinafter, this operating state is called a regenerative state). Here, the rotor of this motor-generator MG is connected to an input shaft of the automatic transmission AT through a damper (not shown).

The second clutch CL2 is a clutch that is installed between the motor-generator MG and the rear-left and rear-right wheels RL, RR, whose engagement and disengagement, including a slip-engagement, are controlled by control pressure produced by a second clutch hydraulic unit 8 based on a control command from an AT controller 7.

The automatic transmission AT is a stepped automatic transmission in which a gear ratio of limited stages, such as five forward speeds and one reverse speed, can automatically be shifted according to vehicle operating conditions, such as a vehicle speed and an accelerator opening angle. The second clutch CL2 is not necessarily a clutch that is further added as a special clutch. Instead, some clutch elements from a plurality of clutches which are selectively engaged at each respective gear shift stage of the automatic transmission AT may comprise the second clutch CL2.

An output shaft of the automatic transmission AT is connected to the rear-left and rear-right wheels RL, RR through the propeller shaft PS, the differential gear DF, the left drive shaft DSL and the right drive shaft DSR, respectively. With regard to the first and second clutches CL1 and CL2, a wet multiple disc clutch whose hydraulic flow amount and hydraulic pressure can be continuously controlled by a proportional solenoid is used for each.

This hybrid drive system has three basic drive modes according to a state of the engagement and disengagement of the first clutch CL1. A first drive mode is an electric vehicle drive mode (hereinafter called an EV drive mode) in which the first clutch CL1 is in a disengaged state and the vehicle travels by only the power of the motor-generator MG as the power source. A second drive mode is a hybrid drive mode (hereinafter called an HEV drive mode) in which the first clutch CL1 is in an engaged state and the vehicle travels while at least the engine E is the power source. Also in this drive mode, the vehicle travels while torque control is carried out to both engine E and motor-generator MG. Here, when changing the mode from the EV drive mode to the HEV drive mode, the first clutch CL1 is in the engaged state, and the engine start is carried out by applying the torque of the motor-generator MG to the engine E. A third drive mode is an engine-used slip drive mode (Wet Start Clutch drive mode, hereinafter called a WSC drive mode) in which the first clutch CL1 is in the engaged state and the second clutch CL2 is subjected to a slip control, and the vehicle travels while at least the engine E is the power source. While in the WSC drive mode, the vehicle is capable of achieving a creep drive, especially when a state of charge (SOC) of a battery 4 is low or when an engine water temperature is low where a control of rotation speed of motor-generator MG is carried out while engine is being controlled at a predetermined rotation speed such that the second clutch CL2 will be operated at a desired slip rate. Note that, when transitioning from EV drive mode to HEV drive mode, first clutch CL1 is engaged and engine will be started using torque of motor-generator MG.

When a driver controls an accelerator pedal to maintain a vehicle stopped state while on an incline with a gradient greater than or equal to a predetermined value (accelerator hill hold), the slip amount of the second clutch CL2 may be too large and will continue in this state in the WSC drive mode. The slip amount of the second clutch CL2 is too large in this case because the revolution speed of the engine E (revolutions per minute, or engine rpm) cannot be set to be lower than an engine idling speed. Accordingly, in the first embodiment, the vehicle further employs a fourth drive mode, which is a motor slip drive mode (Motor Wet Start Clutch drive mode, hereinafter called an MWSC drive mode) in which the first clutch CL1 is disengaged while engine E is operated, and the slip control of the second clutch CL2 is performed while the motor-generator MG is operating. In this manner, the vehicle travels with the motor-generator MG being the only power source even though the engine continues operating.

The above-described HEV drive mode includes three drive modes: an engine drive mode, a motor-assisted drive mode and a running electric power generation mode (hereinafter called a drive generation mode).

In the engine drive mode, the drive wheels are driven with only the engine E as the power source. In the motor-assisted drive mode, the drive wheels are driven with both of the engine E and the motor-generator MG as power sources. In the drive generation mode, while the drive wheels RL, RR are being driven with the engine E as the power source, the motor-generator MG works as a generator to charge the battery 4.

One example of the drive generation mode is during a constant speed (cruise) drive or during an acceleration drive, the motor-generator MG works as the generator by utilizing the power from the engine E to charge the battery 4. In addition, during a deceleration drive, a regeneration of braking energy is carried out to generate electric power by means of the motor-generator MG The brake system of the hybrid vehicle is now described. Each of four wheels RL, RR, FL, and FR is provided with a brake disk 901 and a hydraulic brake actuator 902. In addition, the brake unit 900 supplies hydraulic pressure to each brake actuator 902 associated with four wheels to generate a braking force.

Next, a control system of the hybrid vehicle will be explained. As shown in FIG. 1, the control system of the hybrid vehicle has the engine controller 1, the motor controller 2, the inverter 3, the battery 4, the first clutch controller 5, the first clutch hydraulic unit 6, the AT controller 7, the second clutch hydraulic unit 8, a brake controller 9 and an integrated controller 10. Here, the engine controller 1, the motor controller 2, the first clutch controller 5, the AT controller 7, the brake controller 9 and the integrated controller 10 are connected with each other through a CAN communication line 11 that allows the exchange of information between them.

The engine controller 1 receives information of the engine revolution speed (the engine rpm) from an engine rpm sensor 12 and outputs a command that controls an engine operating point (Ne: the engine revolution speed, Te: an engine torque) to a throttle valve actuator (not shown in the drawing), for example, in accordance with a target engine torque command from the integrated controller 10. The information such as the engine revolution speed Ne, etc., is sent to the integrated controller 10 via the CAN communication line 11.

Note that engine controller 1 is not limited to convey command to throttle valve actuator E1, but, for example, command may be transmitted to a variable valve timing actuator capable of changing the valve timing on either an intake or exhaust side, a valve lift amount variable actuator capable of changing the lift amount of valve, an injector for use of fuel injection, and an actuator for varying the plug ignition timing. Note that the information regarding engine rotation speed Ne and the like may be furnished to integrated controller 10 via CAN communication line 11.

The motor controller 2 receives information from a resolver 13 that detects a rotational position of the rotor of the motor-generator MG and outputs a command that controls a motor operating point (Nm: a motor-generator revolution speed, Tm: a motor-generator torque) of the motor-generator MG to the inverter 3 in accordance with a target motor-generator torque command from the integrated controller 10. Here, the motor controller 2 checks or watches the battery SOC indicating the charge state of the battery 4. The information concerning the battery SOC is used to control the motor-generator MG and is also sent to the integrated controller 10 via the CAN communication line 11.

The first clutch controller 5 receives sensor information from both of a first clutch hydraulic pressure sensor 14 and a first clutch stroke sensor 15 and outputs a command to the first clutch hydraulic unit 6 in accordance with a first clutch control command from the integrated controller 10 to control the engagement and disengagement of the first clutch CL1. Here, information regarding a first clutch stroke C1 S is sent to the integrated controller 10 via the CAN communication line 11.

The AT controller 7 receives input corresponding to sensor information from an accelerator opening angle sensor 16, a vehicle speed sensor 17, a second clutch hydraulic pressure sensor 18 and an inhibitor switch (not shown in the drawing) that outputs a signal corresponding to a position of a shift lever that is operated by the driver. The AT controller 7 then outputs a command that controls the engagement and disengagement of the second clutch CL2 to the second clutch hydraulic unit 8 in an AT hydraulic pressure control valve in accordance with a second clutch control command from the integrated controller 10. Here, information of an accelerator opening angle APO and a vehicle speed VSP and the information from the inhibitor switch are sent to the integrated controller 10 via the CAN communication line 11.

The brake controller 9 controls braking force of four wheels respectively by outputting a control command for controlling four brake actuators 902 to the brake unit 900 for four wheels. Specifically, the brake controller 9 receives sensor information from a road wheel speed sensor 19 that detects each wheel speed of the four road wheels and a brake stroke sensor 20. The brake controller 9 performs a regenerative coordination brake control on the basis of a regenerative coordination control command BS from the integrated controller 10 when, for instance, a braking force is insufficient to meet a braking force required according to a brake stroke sensor 20 in the case where only a regenerative braking force is supplied upon a brake operation by the brake pedal depression. In this way, the shortage of the braking force is compensated by a mechanical braking force (a braking force by a friction brake).

The integrated controller 10 manages consumption energy of the whole vehicle in order to allow the vehicle to travel at a maximum efficiency. The integrated controller 10 receives information from a motor revolution speed sensor 21 that detects the motor revolution speed Nm, a second clutch output revolution speed sensor 22 that detects an output revolution speed N2out of the second clutch CL2, a second clutch torque sensor 23 that detects a transmission torque capacity TCL2 of the second clutch CL2, a brake hydraulic pressure sensor 24, a temperature sensor 10a that detects a temperature of the second clutch CL2 and a G sensor 10b that detects a forward and a reverse acceleration. The integrated controller 10 also receives information obtained via the CAN communication line 11.

Further, the integrated controller 10 performs operating control of the engine E by the control command to the engine controller 1, an operating control of the motor-generator MG by the control command to the motor controller 2, the engagement and disengagement control of the first clutch CL1 by the control command to the first clutch controller 5 and the engagement and disengagement control of the second clutch CL2 by the control command to the AT controller 7.

Figure 2:
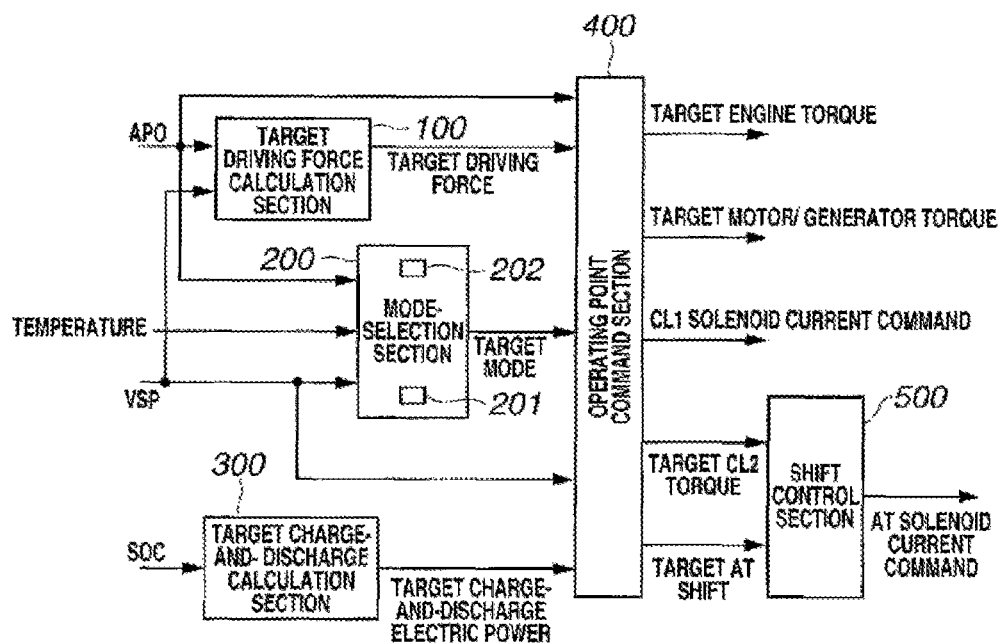
FIG. 2 is a control block diagram illustrating a calculation processing program in an integrated controller in the first embodiment.

Control executed in the integrated controller 10 in the first embodiment is now explained with reference to the control block diagram in FIG. 2. This control is executed for each control period, at a control cycle period of 10 ms for instance, in the integrated controller 10. The integrated controller 10 has a target drive force operating section 100, a mode selecting section 200, a target charge and discharge operating section 300, an operating point commanding section 400 and a speed change or shift control section 500.

Figure 3:
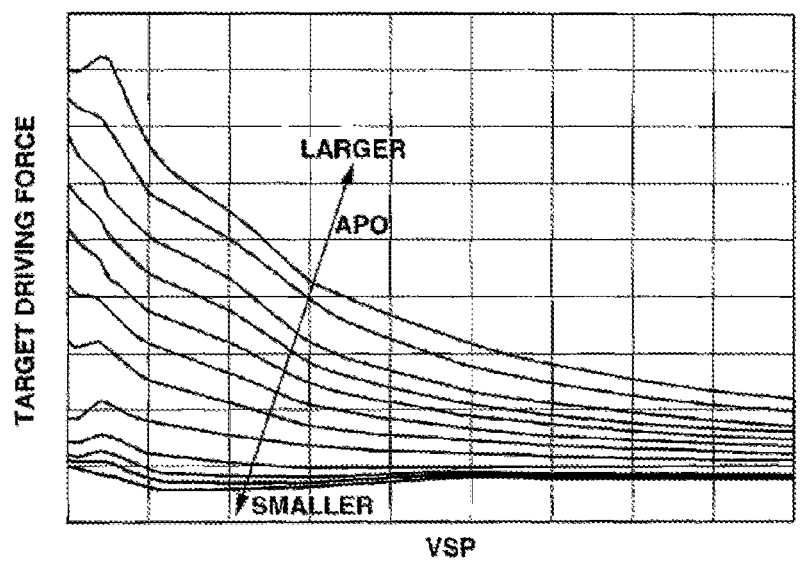
FIG. 3 is an example of a target driving force map used in a target driving force processing calculation at a target driving force calculating section shown in FIG. 2.

The target drive force operating section 100 computes a target drive force tFo0 on the basis of the accelerator opening angle APO and the vehicle speed VSP by using a target drive force map shown in FIG. 3.

Figure 5:
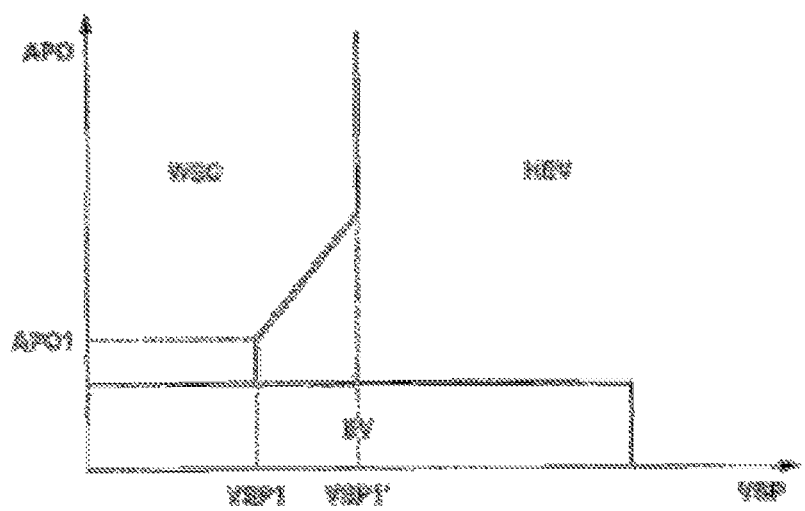
FIG. 5 is a map view representing a normal mode map used in a selection of a target mode at the mode selection section shown in FIG. 2.

The mode selection section 200 selects a drive mode with reference to a mode map shown in FIG. 5 based on the vehicle speed and accelerator opening degree AP0. FIG. 5 illustrates a normal mode map. The normal mode map in FIG. 5 includes the EV drive mode, the WSC drive mode and the HEV drive mode. The target mode is set based on the accelerator opening degree APO and the vehicle speed VSP. It should be noted, however, that even if the EV drive mode is selected, the target mode is forced to select either the HEV drive mode or the WSC drive mode if the battery SOC is smaller than a predetermined value.

The mode selecting section 200 selects a MWSC drive mode in place of WSC drive mode when the estimated road incline gradient becomes greater than or equal to a predetermined value.

In the normal mode map in FIG. 5, with regard to a switching line between the HEV drive mode and the WSC drive mode, the WSC mode is set to be selected in an area that is less than a predetermined accelerator opening degree APO1 and less than a predetermined vehicle speed VSP1 that is smaller than the idle speed of the engine E when the automatic transmission AT is the first gear. Further, regarding the switching line between the HEV drive mode and the WSC drive mode, the HEV mode is set to be selected in an area that is greater than or equal to the predetermined accelerator opening degree APO1 since a great drive torque is required, and greater than or equal to a vehicle speed VSP1' that is higher than the lower limit vehicle speed VSP1. In addition, this drive mode change control is configured so that the WSC drive mode is selected when the battery SOC is low, even in a case of the vehicle start, since the EV drive mode cannot be achieved due to low battery charge.

In a case when the accelerator opening degree APO is large, it can be difficult to meet the request of the large accelerator opening degree APO when the drive torque is equal to an engine torque applied by engine E corresponding to the engine idle speed plus the torque applied by the motor-generator MG. Here, as the engine rpm increases, more drive torque can be output. For this reason, even if the WSC drive mode is carried out up to a higher vehicle speed than the lower limit vehicle speed VSP1, by increasing the engine rpm and outputting the greater drive torque, it is possible to change from the WSC drive mode to the HEV drive mode in a short time. This case corresponds to the WSC area that is extended up to the lower limit vehicle speed VSP1' in FIG. 5.

Figure 4:
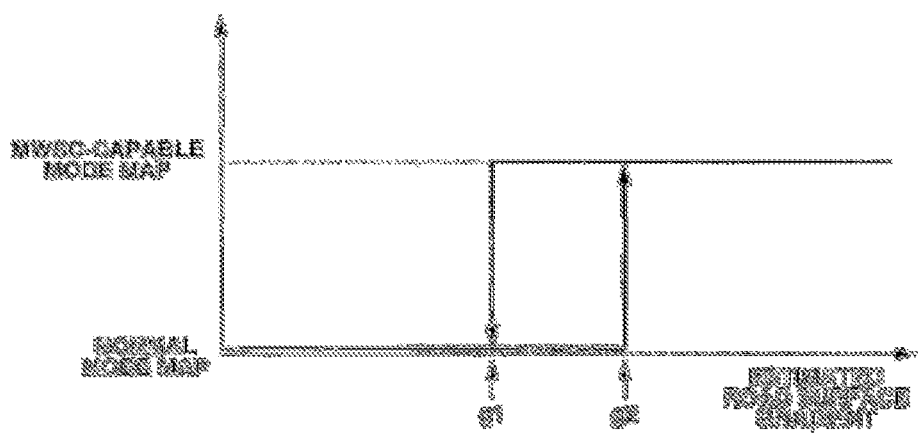
FIG. 4 is a map view representing a relationship between a mode map and an estimated road gradient at a mode selection section in FIG. 2.

The target charge-and-discharge operating section 300 computes a target charge-and-discharge power tP on the basis of the battery SOC by using a target charge-and-discharge amount map shown in FIG. 4.

If SOC≥50%, an EV drive mode region appears in the normal mode map of FIG. 5. Once the EV mode appears within the mode map, this drive mode region continues to appear until the SOC is reduced and becomes below 35%. If SOC<35%, the EV mode region disappears in the normal mode map shown in FIG. 5. If the EV mode region disappears from the mode map, it does not reappear until the SOC reaches 50%.

The operating point commanding section 400 calculates a transitional target engine torque, target motor-generator torque, target second clutch transmission torque capacity, a target shift stage of the automatic transmission AT and a first clutch solenoid current command, as attainment targets of these operating points, on the basis of the accelerator opening degree APO, the target drive torque tFo0, the target mode, the vehicle speed VSP and the target charge-and-discharge power tP. Further, the operating point commanding section 400 also includes an engine start control section that starts the engine E when transitioning from the EV drive mode to the HEV drive mode.

The shift controller 500 drives and controls a solenoid valve in the automatic transmission AT to achieve the target second clutch transmission torque capacity and the target shift stage along a shift schedule shown in a shift map of the automatic transmission AT. Here, the target shift stage is preset in the shift map according to the vehicle speed VSP and the accelerator opening degree APO.

Next, details of the WSC drive mode are explained. The WSC drive mode is the state in which the engine E is maintained in the operated state and has a high response to a variation in the requested drive torque. More specifically, with the first clutch CL1 fully engaged, the slip control of the second clutch CL2 is executed as the transmission torque capacity TCL2 is varied according to the requested drive torque. The vehicle travels using the drive torque applied by the engine E and/or the motor-generator MG.

Since an element, such as a torque converter, which can absorb a difference in revolution speeds, is absent from the hybrid vehicle in the first embodiment, the vehicle speed is determined in accordance with the engine revolution speed of the engine E if the first clutch CL1 and the second clutch CL2 are fully engaged and the shift stage of the automatic transmission AT is fixed. In order to maintain the self-rotation of the engine E, a lower limit of the revolution speed according to the idling speed is present. The lower limit of the revolution speed becomes higher when a so-called idle-up operation is carried out during warm-up of the engine E. Furthermore, under conditions where the requested drive torque is high, rapid transition to the HEV drive mode cannot be completed. Note that the "complete engagement or connection" is intended to indicate a state in which the clutch does not undergo a slip (difference in rotation speeds), and, this state may be achieved to hold the transmission torque capacity of the clutch sufficiently larger than the torque to be transmitted.

On the other hand, in the EV drive mode, since the first clutch CL1 is disengaged, there is no lower limit associated with the above engine revolution speed. However, when traveling by the EV drive mode is made difficult due to a limit based on the battery SOC, or when the required drive torque cannot be attained by the motor-generator MG alone, a stable torque produced by the engine E is required to achieve the requested drive torque.

Therefore, at a low vehicle speed area where the vehicle speed is lower than the speed corresponding to the lower limit, where traveling in the EV drive mode is difficult, or where the requested drive torque cannot be attained by the motor-generator MG alone, the engine revolution speed is maintained at a predetermined lower limit revolution speed, the second clutch CL2 is slip-controlled, and the WSC drive mode is selected so that the vehicle travels using the engine torque according to the slip control of the second clutch CL2.

Now, description is made of the problem associated at the time of transition to the HEV drive mode from WSC drive mode. In the WSC drive mode, while setting the engagement capacity of the second clutch LC2 to a value corresponding to a target drive torque, motor-generator MG is placed under a rotation speed control at a target motor-generator rotation speed by adding a predetermined slip amount to the output rotation speed thereof. Then, when transitioning from the WSC drive mode to the HEV drive mode, second clutch CL2 will be completely engaged or connected, and motor-generator MG is switched along with engine E to a torque control to achieve the target drive torque.

At this time, the equation of motion of the power train is expressed as follows in accordance with the engaged state of the second clutch CL2.

(a) second clutch in engagement state $$(JENG+JMG+JO) \times dwO/dt = TIn\_HEV - TR/L \quad \text{(Equation 1)}$$

(b) the second clutch in slip state $$JO \times dwO/dt = TCL2 - TR/L \quad \text{(Equation 2)}$$

$$(JENG+JMG) \times dwin/dt = TIn\_WSC - TCL2 \quad \text{(Equation 3)}$$

Here, J ENG denotes engine inertia, J MG denotes motor generator inertia, J O is the output shaft inertia, dw O/dt is the second clutch output shaft angular acceleration, dw in/dt is the second clutch input shaft angular acceleration, T In_HEV is the input torque at the HEV drive mode, T R/L is running resistance, T CL2 is the second clutch transmission torque, and T In_WSC represents the input torque in WSC drive mode, respectively.

At this time, when the travel mode transitions, without taking the relationship of the inertia as described above into consideration, the inertia changes as soon as the slip amount of the second clutch CL2 has become zero, so that the output shaft torque fluctuates causing a risk of giving the driver a feel of discomfort.

Thus, in the first embodiment, a torque transfer capacity of the second clutch CL2 is decided such that the output shaft angular acceleration dω/dt would be set to be the same even if the amount of slip of second clutch CL2 has become zero from a predetermined amount.

When the dωO/dt in Equation (a) and the dωO/dt in Equation (b) are the same value, then, in Equation (2); the following result is obtained.

$$dwO/dt = 1/JO \times (TCL2 - TR/L)$$

When this is substituted into equation (1), this can be expressed as follows:

$$TCL2 = (JO/(JENG+JMG+JO)) \times TIn\_HEV + (JENG+JMG)/(JENG+JMG+JO) \times TR/L \quad \text{(Equation 4)}$$

where $$(JO/(JENG+JMG+JO)) = \text{alpha}, (JENG+JMG)/(JENG+JMG+JO)$$

When you place a) is expressed by β (beta), the equation may be expressed as:

$$TCL2 = \text{alpha} \times TIn\_HEV + \beta \times TR/L \quad \text{(Equation 5)}$$

This indicates the torque transfer capacity which would not cause variation in drive force before and after engagement of the second clutch CL2.

However, since the output shaft inertia J O is extremely large compared to engine inertia J ENG or motor generator inertia J MG such that the relationship, α>>β, is obtained. Therefore, β is considered so as not to significantly affect much as a whole, but in situations such as at startup where the automatic transmission AT has selected low gear such as a first gear speed or the like, the effects cannot be ignored.

Therefore, a basic target transmission torque capacity T CL2 base of the second clutch CL2 is obtained according to the following equation:

$$TCL2\ base = \alpha \times TIn\_HEV \quad \text{(Equation 5)}$$

In other words, the inertia component on the input side, βT×TR/L, is deducted for correction. Thus, the transfer torque capacity of the second clutch CL2 is set slightly less than the value calculated according to the equation above and configured to be a value which is not affected by the driving environment so that the change in inertia associated with the slip amount becoming zero can be absorbed smoothly.

In other words, in a state where the accelerator pedal is off or released, and the input-side rotational speed of the second clutch CL2 is under speed control to the speed approximately corresponding to the idle rotation speed, the input shaft angular acceleration is controlled to be zero. This situation generally corresponds to a creep running condition or a vehicle stopped state. At this time, the torque control is carried out by the engine E, and the rotational speed control is performed at about the idle speed by the motor generator MG, power generation is performed in the motor generator MG. In such a case, there is substantially no need to consider the input side inertial component, $\beta$. Accordingly, after the transmission torque capacity of the second clutch CL2 based on the creep torque is determined, a correction torque obtainable from Equations (4) and (5) corresponding to $\beta \times T$ R/L is deducted from the target drive torque at the input side. As a result, the accuracy of power generation torque of the motor-generator MG is increased. Incidentally, the running resistance is slightly different depending on the number of passengers, gradient of slop, and the like, but it is determinable within a certain range so that an appropriate value may be set as the initial value.

FIG. 6 is a control block diagram for performing a target second clutch torque transfer capacity calculation process in the mode transition in the first embodiment. Once target driving torque T in_HEV is calculated on the basis of the accelerator pedal opening degree, then the target driving torques of each of -motor generator MG and the engine E are calculated based on that value. Meanwhile, in the basic target torque transfer capacity calculation unit 401, based on the above equation (4), the basic target transmission torque capacity T CL2 base is calculated.

In the correction table 402, based on the target driving torque T In_HEV, a first correction amount T Hosei1 for correcting the torque transfer capacity of the second clutch CL2 is calculated. The correction amount is determined in consideration of the fluctuations of the hydraulic actuator and the variation of the second clutch CL2, such that an input torque T in_HEV is corrected to remain greater than the second clutch transmission torque capacity T CL2. When transitioning to the HEV drive mode from the WSC drive mode, since the second clutch CL2 becomes migrated to a completely engaged state from the slip state, the relationship, T In_HEV<T CL2, is final. However, when achieving this relationship in the slip state, because there is a possibility that shock is generated at the time of the engagement, until the slip amount has reached zero, the relationship of the inequality above is ensured to be maintained even if he second clutch torque transfer capacity varies.

In the correction map 403, a second correction amount T hosei2 for correcting the torque transfer capacity is calculated based on an input shaft rotation speed, an ATF temperature representing an automatic transmission oil temperature, the line pressure, etc. Since the input friction of the second clutch CL2 is different depending on these parameters, the second correction amount is corrected in consideration of these values.

In the second clutch torque transfer capacity calculation unit 404, a final target second clutch transfer torque capacity T CL2 is calculated and output by summing the basic target transfer torque capacity T CL2 base, a first correction amount T Hosei1, and a second correction amount T Hosei2.

Now, operations are described. FIG. 7 is a time chart showing the starting state of the vehicle from the stopped state in the hybrid vehicle of the first embodiment. The initial condition is a vehicle stop state in the WSC drive mode.

With the vehicle being stopped, the target second clutch torque transfer capacity is set based on the target drive torque (creep torque corresponding value). At this time, since the accelerator pedal is not pushed down, and there is no intention to accelerate, angular acceleration change does not occur at the input side. That is, since accelerator pedal is in an off state and the target rotation speeds of both engine E and motor-generator MG are below the idling rotation speed, a correction torque, $\beta \times T$ R/L will be subtracted from the target drive torque that has been set for a creeping torque equivalent value. Therefore, the accuracy of power generation torque by motor-generator MG will be increased.

Next, at time t1, when the accelerator pedal is depressed, the correction to reduce the correction torque above is released, and the target driving torque is increased, so that the target second clutch torque transfer capacity rises accordingly. Thereby, the output rotational speed of the second clutch CL2 also rises as the torque is transmitted to the drive wheels. At time t2, when a mode transition instruction to the HEV drive mode is output from the WSC drive mode in accordance with an increase in vehicle speed as well as the increase in the accelerator pedal opening degree, the second clutch target torque transmission capacity will be corrected such that the output rotational angular acceleration would not change in response to inertial change before and after the change in a state of the second clutch between a slip state and a complete engagement state. Thus, while maintaining the second clutch target torque transmission capacity smaller than the target drive torque, the slip amount of the second clutch CL2 will decrease gradually.

Then, at time t3, even at the stage when the slip amount of the second clutch CL2 becomes zero, the second clutch target torque transmission capacity is set smaller than the target drive torque. Therefore, even if inertia of the power train should change when the slip amount becomes zero, the engagement shock does not occur, and step in the driving force does not occur.

At time t4, since the second clutch CL2 is completely engaged state already, the second clutch target torque transmission capacity is set to be larger than the target drive torque. At this time, the slip is not generated in the second clutch CL2 already, because the inertia of the power train is not changed before and after time t4, the engagement shock or the like does not occur.

Figure 8:
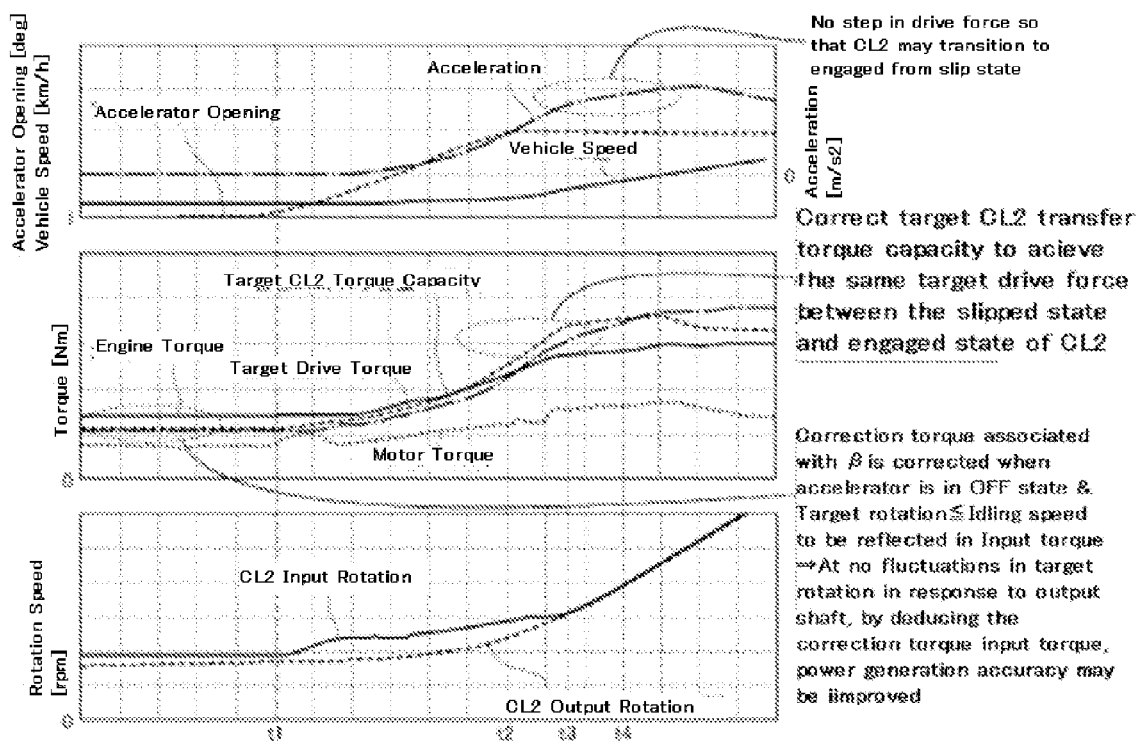
FIG. 8 is a time chart showing the starting state for the creep running state.

In the hybrid vehicle of the first embodiment, FIG. 8 illustrates a time chart showing the starting state from the creep running or driving state. The initial condition is a creep driving state in the WSC drive mode.

At the creep driving, as in the state of vehicle stop, the creep torque corresponding or equivalent value is set as the target driving torque, and target second clutch torque transfer capacity is set based on this value. In addition, since the brake pedal is not depressed, the vehicle travels at constant, yet very low vehicle speed. At this time, since the accelerator pedal is not depressed, there is no intention to accelerate, an angular acceleration change does not occur at the input side. That is, a correction torque corresponding to $\beta \times T$ R/L is deducted from a target drive torque set for a creeping torque equivalent value at accelerator-off state with the target rotation speeds for both engine E and motor-generator MG being below an idling rotation speed. Therefore, the accuracy of power generation torque of the motor generator MG may be improved.

Next, at time t1, in response to the accelerator pedal being depressed, the correction to reduce the correction torque above is released, the target driving torque is increased, and the target second clutch torque transfer capacity rises accordingly. This causes to transfer torque further to the drive wheels so that the output rotation speed of the second clutch CL2 accelerate to rise from the constant speed.

At time t2, when the mode transition instruction to the HEV drive mode from the WSC drive mode is output in accordance with the increase in the accelerator opening degree and an increase in vehicle speed, the second clutch target torque transmission capacity will be corrected such that the output rotation angular acceleration of the second clutch CL2 would not change despite the change in inertial before and after the transition of the second clutch from the slip state to the fully engaged state. Thus, while maintaining the second clutch target torque transmission capacity smaller than the target drive torque, the slip amount of the second clutch CL2 decreases gradually.

Then, at time t3, even at the stage when the slip amount of the second clutch CL2 becomes zero, the second clutch target torque transmission capacity is set smaller than the target drive torque. Therefore, even when the inertia of the power train changes when the slip amount becomes zero, engagement shock does not occur and the driving force step does not occur. At time t4, since the second clutch CL2 has already been completely engaged, the second clutch target torque transmission capacity is set to be larger than the target drive torque. At this time, the slip is free from generation in the second clutch CL2, and because the inertia of the power train is not changed before and after time t4, the engagement shock or the like does not occur.

As described above, in the first embodiment, the operational effects may be obtained as described below:

(1) A second clutch CL2 (starting clutch) between a motor-generator MG (drive source) and drive wheels, a WSC drive mode (slip drive mode) in which the vehicle travels with motor-generator MG placed under rotation speed control while performing a slip control on the second clutch CL2, a HEV drive mode (engagement drive mode) in which the vehicle travels with the motor-generator placed under a torque control while fully engaging the second clutch CL2, and a clutch control mechanism that controls a second clutch transfer torque capacity at the time of slip control (starting clutch transfer torque capacity) are provided. The clutch control mechanism sets, when transitioning in mode between the WSC drive mode and the HEV drive mode, the second clutch transfer torque capacity so as to provide the same drive torque between the slip state and the engagement state of the second clutch CL2. Stated another way, as expressed in Equation (4), considering the difference in inertia depending on the slip state or fully engaged state of the second clutch CL2, the second clutch transfer torque capacity is decided such that the output rotation angular acceleration of the second clutch CL2 would not vary.

In other words, depending on the slip sate and engaged state of the second clutch, the inertia components in the drive torque transfer system vary. Thus, even when the second clutch transfer torque capacity is maintained constant, the torque output to the drive wheels may change. Therefore, by setting the second clutch transfer torque capacity in such a way that the torque to be output to the drive wheel side would not change in response to change in inertial before and after the engagement, the step in drive torque will be absorbed to achieve the stable driving state.

To be more specific, the second clutch transfer torque capacity at the slip state is set by deducting the torque associated with the inertial components at the side of the drive from the target drive torque which is set in accordance with an accelerator opening degree.

In other words, since the output shaft inertia J O assumes an extremely large value compared to engine inertia JENG or motor generator inertia JMG such that $\alpha \gg \beta$. Therefore, $\beta$ might be considered not to significantly affect as a whole, but its effect cannot be ignored such as at starting state where the automatic transmission AT has selected a low speed gear such as a first speed ratio or the like Consequently, by carrying out a correction by way of reduction of the inertia component $\beta \times T$ R/L, the transfer torque capacity of the second clutch CL2 will be set slightly less than the value calculated in accordance with the equations described above and is configured to assume the value free from influence of driving environments, etc. Therefore, the change in inertia at the slip amount being zero may be absorbed gradually.

(2) The clutch control mechanism deducts a first correction torque (or corrects) the second clutch transfer torque capacity so as to be less than the input torque of the drive source.

Stated another way, considering variations or tolerances in second clutch CL2, hydraulic actuators, and the like, by correcting in such a way that the input torque T in_HEV is larger than the second clutch transfer torque capacity T CL2, the shock at the transition to the complete engagement may be reduced.

(3) The clutch control mechanism corrects the second clutch transfer torque capacity by a second correction torque (value) considering the friction or viscosity at the drive source side when transitioning from the sip state to the engagement state (or from engaged state to the slip state). Thus, the conditions on the input side of the second clutch CL2 may be accurately reflected to achieve the stable engagement control of the second clutch.

(4) A second clutch CL2 (starting clutch) between a motor-generator MG (drive source) and drive wheels, a WSC drive mode (slip drive mode) in which the vehicle travels with motor-generator MG placed under rotation speed control while performing a slip control on the second clutch CL2, a clutch control mechanism that controls the second clutch transfer torque capacity at the slip state, and an accelerator opening degree sensor 16 (accelerator opening detector) to detect the accelerator opening degree are provided. When motor-generator MG is controlled at idling rotation speed (constant rotation speed) and the accelerator opening is not detected, the second clutch transfer torque capacity will be calculated such that the same drive torque is attained between the slop state and the engaged state of the second clutch CL2. Further, out of this second clutch torque transfer capacity, such torque that is related to the inertia components on the drive source side will be reduced or deducted from the torque at the side of drive source.

In other words, during the states of vehicle stop or creeping drive, engine E is torque controlled while a rotation speed control is conducted by motor-generator MG generally at the idling speed thereby motor-generator generates electricity. In this state, the inertial associated with rotational components $\beta$ is not necessary to be taken into account. Thus, after the transfer torque capacity of the second clutch CL2 has been determined based on the creeping torque, a correction is made and the correction torque that is obtainable from Equations (4) and (5) will be deducted from the target drive torque on the input side. Therefore, the accuracy of power torque at motor-generator MG may be improved.

As described above, explanation has been made based on the first embodiment, the present invention is not limited to these, but may take other configurations without departing the scope of the present invention. In the first embodiment, description is made with respect to the transition from the slip state to the engaged state. The similar control is applicable when transitioning from the engaged state to the slip state.

Moreover, the embodiment is applied to the transition from the WSC drive mode to the HEV drive mode. Even at the transitions between other drive modes, as long as the clutch undergoes change between the slip state and the engaged state, similar control may be applicable.

In the first embodiment, description is made on the rear wheel drive hybrid vehicle. However, the present invention may be applicable to the FF hybrid vehicle as well.

In addition, the configuration is shown in which a clutch within the automatic transmission is commonly used for the second clutch, a separate starting clutch may be provided between the motor-generator and the automatic transmission. The clutch may alternatively be positioned between the automatic transmission and the drive wheels.

The invention claimed is:

1. A control device for a hybrid vehicle comprising:
   a starting clutch disposed between a drive source and drive wheels;
   a slip drive mode in which the vehicle travels with the drive source placed under a rotation speed control at a higher rotation speed than an output side rotation speed of the starting clutch while performing a slip control on the starting clutch to achieve a value in accordance with a target drive torque set based on an accelerator pedal opening;
   an engagement drive mode in which the vehicle travels with the drive source placed under a torque control in accordance with the target drive torque set based on the accelerator pedal opening while fully engaging the starting clutch; and
   a clutch control mechanism that controls a starting clutch transfer torque capacity at a time of the slip control, wherein
   the clutch control mechanism, when transitioning in mode from the slip drive mode to the engagement drive mode, calculates a transfer torque capacity that ensures a same output shaft angle acceleration between a slip state and an engaged state of the starting clutch, and deducts from this transfer torque capacity inertia components at a side of drive source to set the starting clutch transfer torque capacity at the slip state.

2. The control device for a hybrid vehicle as claimed in claim 1, wherein
   the clutch control mechanism is configured to correct the starting clutch transfer torque capacity less than the input torque of the drive source when transitioning between the slip state and the engaged state.

3. The control device for a hybrid vehicle as claimed in claim 1, wherein
   the clutch control mechanism corrects the starting clutch transfer torque capacity by a value considering a friction or viscosity on the side of the drive source when transitioning between the slip state and the engaged state.

4. A control device for a hybrid vehicle, comprising:
   a starting clutch disposed between a drive source and drive wheels;
   a slip drive mode in which the vehicle travels with the drive source placed under a rotation speed control at a higher rotation speed than an output side rotation speed of the starting clutch while performing a slip control on the starting clutch to achieve a value in accordance with a target drive torque set based on an accelerator pedal opening;
   a clutch control mechanism that controls a starting clutch transfer torque capacity at a time of the slip control; and
   an accelerator pedal opening detector to detect an accelerator pedal opening degree, wherein the clutch control mechanism, when the drive source is controlled at a constant rotation speed and the accelerator opening is not detected, calculates a transfer torque capacity that ensures a same output shaft angle acceleration between a slip state and an engaged state of the starting clutch, and deducts from the transfer torque capacity inertia components at a side of drive source out of the transfer torque capacity.

* * * * *